(12) United States Patent
Orth

(10) Patent No.: US 7,337,020 B2
(45) Date of Patent: Feb. 26, 2008

(54) OPEN-LOOP AND CLOSED-LOOP CONTROL UNIT

(75) Inventor: Stefan Orth, Eschenburg (DE)

(73) Assignee: Diehl Avionik Systeme GmbH, Ueberlingen (DE)

( * ) Notice: Subject to any disclaimer, the term of this patent is extended or adjusted under 35 U.S.C. 154(b) by 372 days.

(21) Appl. No.: 11/175,649

(22) Filed: Jul. 6, 2005

(65) Prior Publication Data

US 2006/0009958 A1 Jan. 12, 2006

(30) Foreign Application Priority Data

Jul. 9, 2004 (DE) .................. 10 2004 033 263

(51) Int. Cl.
*G05B 11/01* (2006.01)
*G06F 11/00* (2006.01)
*G06F 17/50* (2006.01)

(52) U.S. Cl. ............................. 700/21; 714/24; 703/14

(58) Field of Classification Search .................. 700/21
See application file for complete search history.

(56) References Cited

U.S. PATENT DOCUMENTS

| | | | |
|---|---|---|---|
| 4,667,284 A | | 5/1987 | Asami |
| 5,880,954 A | * | 3/1999 | Thomson et al. ............. 700/79 |
| 5,901,927 A | * | 5/1999 | Ho ............................. 244/183 |
| 6,701,198 B1 | * | 3/2004 | Vandesteeg et al. ......... 700/79 |
| 6,778,867 B1 | * | 8/2004 | Ziegler et al. ............... 700/79 |
| 6,909,923 B2 | * | 6/2005 | Vasko et al. .................. 700/79 |
| 7,117,048 B2 | * | 10/2006 | Gibart .......................... 700/79 |
| 7,167,762 B2 | * | 1/2007 | Glanzer et al. ............... 700/79 |
| 2002/0111756 A1 | * | 8/2002 | Modgil ......................... 702/63 |
| 2004/0117102 A1 | | 6/2004 | Weir et al. |
| 2005/0060606 A1 | * | 3/2005 | Kalan et al. .................. 714/12 |
| 2006/0142954 A1 | | 6/2006 | Muller et al. |

FOREIGN PATENT DOCUMENTS

| | | |
|---|---|---|
| DE | 32 08 573 C2 | 9/1983 |
| DE | 32 09 718 A1 | 9/1983 |
| DE | 102 34 303 A1 | 2/2004 |

* cited by examiner

*Primary Examiner*—Thomas K. Pham
(74) *Attorney, Agent, or Firm*—Laurence A. Greenberg; Werner H. Stemer; Ralph E. Locher

(57) ABSTRACT

An open-loop and closed-loop control unit for a safety-relevant apparatus, in particular for aviation applications, has a computer unit with a number of computer inputs and computer outputs, and a circuit unit with a number of circuit inputs and circuit outputs. The circuit unit has hardware components for simulating some of the logic operations that can be carried out in the computer unit. The circuit inputs and computer inputs that correspond to one another with respect to the simulated logic operations are each connected in parallel to a signal input line. The computer outputs and circuit outputs which correspond to one another with respect to the simulated logic operations are each connected to a decision-making unit, by which an output signal for open-loop control of the safety-relevant apparatus can be emitted as a function of the correspondence between the signals from the computer output and from the circuit output.

6 Claims, 1 Drawing Sheet

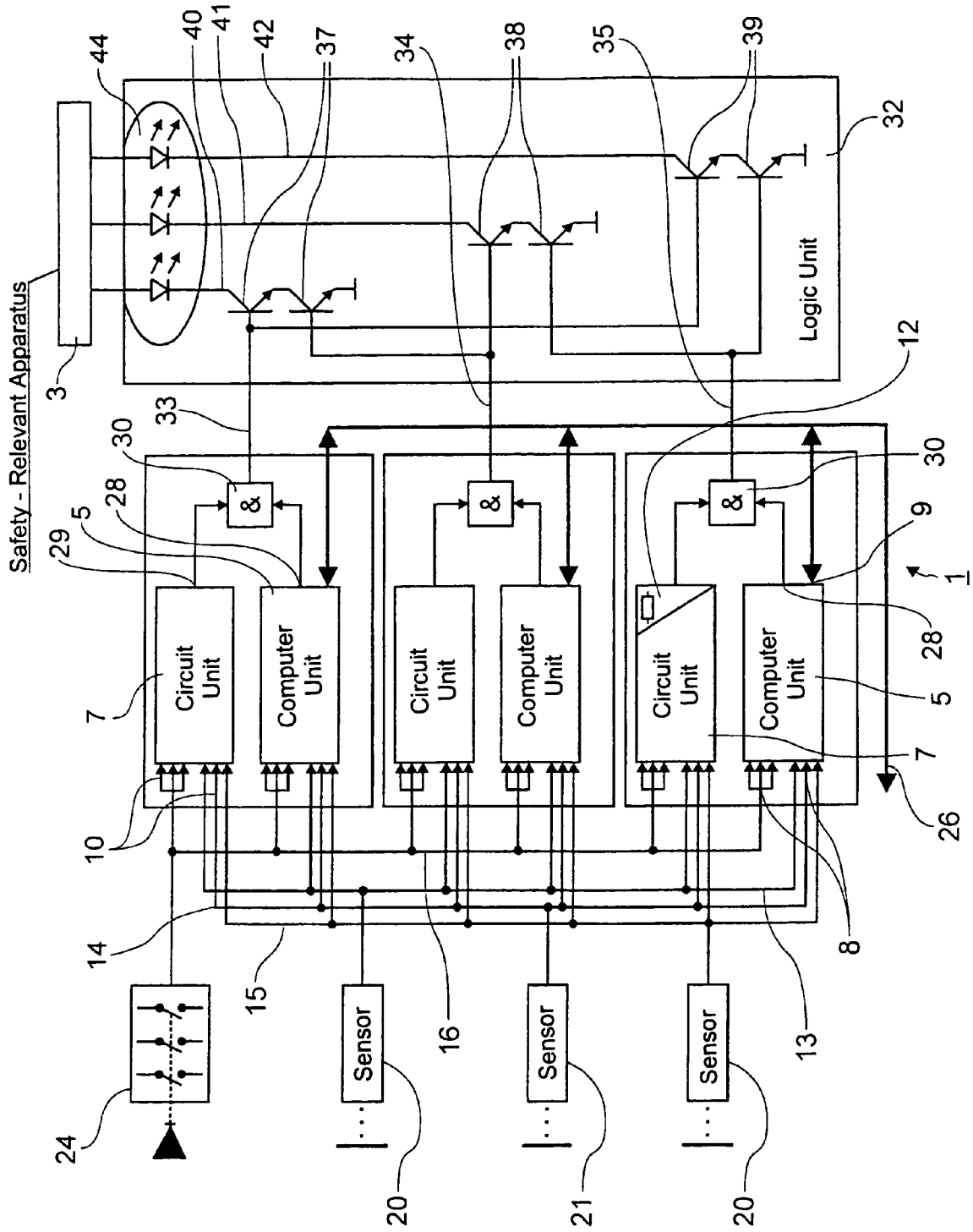

OPEN-LOOP AND CLOSED-LOOP CONTROL UNIT

BACKGROUND OF THE INVENTION

Field of the Invention

The invention relates to an open-loop and closed-loop control unit for a safety-relevant apparatus, in particular for aviation.

A malfunction of safety-relevant apparatus, for example a release mechanism for an emergency slide, a door closing mechanism or a cabin pressure controller in an aircraft, an airbag release mechanism or a braking system in road vehicles, or a door closing mechanism or a braking system in rail vehicles, can lead to accidents with unpredictable consequences. A faulty display system for informing a vehicle driver about the operating state, the speed or the orientation of a vehicle can also lead to incorrect assessments of the given situation, and can thus likewise lead to accidents with avoidable consequences.

In order to reduce the risk of failures of an open-loop and closed-loop control unit for a safety-relevant apparatus such as this, it is known for the open-loop and closed-loop control unit to be configured in a redundant form, that is to say to be at least duplicated. If one of the redundant open-loop and closed-loop control units fails, then the other open-loop and closed-loop control unit, which is still sound, can continue to provide the open-loop and closed-loop control for the apparatus, without this resulting in a failure of the overall system.

However, as a result of the presence of two or more identical components, a redundant open-loop and closed-loop control unit results in a risk of so-called common-mode faults. A common-mode fault is a fault which is based on an intrinsic characteristic of an individual component, and which therefore occurs identically for each individual component with an identical configuration and the same initial conditions. Such intrinsic faults are based, for example in the case of processors, on programming errors or design errors and, in the case of components, on design errors or physical weaknesses. A redundant architecture therefore does not lead to the elimination of such common-mode faults. If a fault such as this occurs, then this leads to a malfunction of the overall system, with unpredictable consequences, despite the redundant architecture.

As a solution to avoid common-mode faults, it is known for the at least duplicated components in a redundant open-loop and closed-loop control unit to be developed independently from one another, both with respect to their hardware and with respect to their software. This allows identical faults resulting from copying to be avoided. However, in order to avoid them completely, it is necessary for the development work to be carried out by independent development teams. A solution such as this is disadvantageous because the repeated development work is costly.

SUMMARY OF THE INVENTION

It is accordingly an object of the invention to provide an open-loop and closed-loop control unit which overcomes the above-mentioned disadvantages of the prior art devices of this general type, which is cost-effective and furthermore has a low failure probability as a result of common-mode faults.

According to the invention, the object is achieved by an open-loop and closed-loop control unit which has a computer unit with a number of computer inputs and computer outputs, and a circuit unit with a number of circuit inputs and circuit outputs. The circuit unit uses hardware components to simulate some of the logic operations that can be carried out in the computer unit. The circuit inputs and computer inputs that correspond to one another with respect to the simulated logic operations are each connected in parallel to a signal input line. The computer outputs and the circuit outputs which correspond to one another with respect to the simulated logic operations are each connected to a decision-making unit, by which an output signal for open-loop control of the safety-relevant apparatus can be emitted as a function of the correspondence between the signals from the computer output and from the circuit output.

A first step of the invention is in this case based on the idea that a specific logic operation which is carried out in a computer unit, for example on the basis of specific software, can be simulated relatively cost-effectively by hardware components. In a second step, the invention is based on the idea that the failure probability resulting from a common-mode fault in an open-loop and closed-loop control unit is reduced by using a computer unit and a circuit unit which use hardware components to simulate some of the logic operations which can be carried out in the computer unit, in comparison to an open-loop and closed-loop control unit with two identical computer units. This is because no common-mode faults occur with respect to the logic operations that are simulated by hardware components.

With the same circuitry, the circuit unit essentially uses the input signals to determine the same output signal as the computer unit when carrying out the corresponding logic operation. Those inputs of the circuit unit and computer unit that correspond to one another with respect to the logic operation are for this purpose each connected in parallel to a signal input line. In this context, "essentially the same signal" means that the signal information items correspond to one another. Other signal characteristics such as the voltage, current level, height etc. may differ from one another. If two output signals correspond, that is to say their signal information items correspond, it can be deduced that the open-loop and closed-loop control unit is operating correctly. For this purpose, the signals from a computer output and from a circuit output are checked by a decision-making unit for correspondence, and the decision-making unit emits an output signal for open-loop control of the safety-relevant apparatus as a function of this check.

The output signal that is emitted from the decision-making unit may be used for activation and for deactivation of different functions of the safety-relevant apparatus. For example, if correspondence is found between the two signals, that is to say the open-loop and closed-loop control unit is operating correctly with respect to the simulated logic operation, the output signal can be used, for example, to release the emergency slide in an aircraft. On the other hand, if the signals from the computer unit and the circuit unit correspond, the emitted control signal can also be used to block the initiation of a mechanism. In the latter case, the decision-making unit can also be configured such that it emits an output signal when the signals from the computer unit and the circuit unit do not correspond.

The computer unit may be a microprocessor in the widest sense or any other integrated circuit. The computer unit is distinguished by being able to use appropriate software to carry out desired logic operations. The circuit unit uses hardware components, that is to say electronic and electrical components, to simulate specific logic operations in a fixed form, with an output signal being linked to one or more input signals in the desired logic.

The invention offers the advantage of cost-effectively avoiding common-mode faults by using hardware components to map or simulate some of the logic operations that can be carried out by a computer unit. The failure probability can be advantageously influenced by choice of those logic operations that can be carried out by the computer unit and are simulated by hardware components in the circuit unit.

It is advantageous for the circuit unit to use hardware components to simulate the safety-critical portion of the logic operations that can be carried out in the computer unit. This reduces the failure probability with respect to the safety-relevant functions, while at the same time reliably avoiding the occurrence of common-mode faults for them. Other functions of the computer unit, which cannot be classified as being safety-critical, need not necessarily be redundant.

The failure probability of the open-loop and closed-loop control unit can be further reduced by providing two or more identical computer units, circuit units and decision-making units. The computer units and circuit units are connected in parallel with one another with respect to the signal lines and the outputs of the decision-making units are connected to a logic unit, by which an open-loop control signal for open-loop control of the safety-relevant apparatus can be emitted as a function of the correspondence between the output signals. As a result of there being at least two computer units, circuit units and decision-making units, this refinement offers additional resistance to failures, both with respect to passive redundancy and active redundancy. In the case of passive redundancy, the system will switch to the other, sound system unit in the event of failure of one system unit. In the case of active redundancy, all of the redundant system units are supplied with the same input signals by connecting them in parallel. A conclusion about the operability of the individual system units can then be drawn by comparing the output signals from all of the system units with one another. If one system unit fails, its output signals are no longer used for open-loop control of the safety-relevant apparatus. In addition, if the output signals do not match, a warning signal can be used to advise that there is a fault in the system, which must be rectified.

In the stated refinement, the circuit units receive the same input signals as the computer units with respect to the logic operations simulated by them. To this extent, those logic operations that are simulated by circuit units are, so to speak, in a double-redundant form with respect to the computer units. Comparison of the output signals from in each case one circuit unit and in each case one computer unit results in high resistance to failures, while at the same time avoiding common-mode faults. The output signals from the respective decision-making units which check the correspondence between the output signals from in each case one circuit unit and in each case one computer unit are themselves in turn checked by a logic unit for correspondence. In this case, it is feasible to in each case activate or to deactivate the safety-relevant apparatus when the signals correspond. If all of the signals correspond, a safety-relevant action can be carried out. On the other hand, it is also feasible for a safety-maintaining measure to be activated if the signals do not correspond, that is to say in response to the information that the system is faulty.

There are advantageously an odd number, in particular three, of the computer units, circuit units and decision-making units, with the logic unit being configured to emit the open-loop control signal on the basis of a majority decision with respect to the output signals. In the ideal case, when all of the system units in the open-loop and closed-loop control unit are operating, the outputs from the decision-making units produce corresponding signals. If a fault occurs in one of the redundant systems, then the incorrect signal is overruled by the majority decision. This is, of course, dependent on the probability of a system failure in which the two or more redundant systems fail at the same time in such a manner that they produce the same incorrect output signals being negligibly small. To this extent, when the output signals differ, the described open-loop and closed-loop control unit assumes, as its conclusion, the situation which corresponds to the highest probability. The safety-relevant apparatus is activated or deactivated on the basis of a majority decision from the available output signals from the decision-making units.

With all of the described redundant architectures, the computer units can, of course, carry out further logic operations in addition to the logic operations that are simulated by the circuit units. The extent to which the output signals from computation units, which may be at least duplicated, are compared with one another with respect to the logic operations which are not simulated by the circuit units, are checked for correspondence or are used to draw other conclusions is in this case irrelevant to the essence of the invention described here.

One or each computer unit is expediently configured to check the signals from the circuit outputs and computer outputs. This results in a self-checking system which itself identifies discrepancies between the signals from the circuit output and the computer output, and thus system faults. It is feasible to use such fault identification to ensure that, when making a majority decision, those signals that have originated from a defective system unit on the basis of the self-check are no longer included in the decision-making process from the start.

Other features which are considered as characteristic for the invention are set forth in the appended claims.

Although the invention is illustrated and described herein as embodied in an open-loop and closed-loop control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single Figure of the drawing is a block diagram of a basic configuration of an open-loop and closed-loop control unit for releasing an emergency slide in an aircraft.

DESCRIPTION OF THE PREFERRED EMBODIMENT

Referring now to the single FIGURE of the drawing in detail, there is shown a basic configuration of an open-loop and closed-loop control unit 1 for a safety-relevant apparatus 3. The release mechanism for an emergency slide in an aircraft is controlled in an open-loop or closed-loop control manner, as the safety-relevant apparatus 3.

In a similar way to that in the case of an airbag in a motor vehicle, the emergency slide of an aircraft may be released only when very specific external conditions occur. For example, the door opening angle must have exceeded a specific amount since, otherwise, the emergency slide would be blown into the interior of the aircraft, with unpredictable consequences. The release mechanism for an emergency slide is thus among the highly safety-relevant apparatuses in an aircraft.

The open-loop and closed-loop control unit 1 illustrated is provided with triple redundancy. It therefore in each case contains three computer units 5 and three circuit units 7 in order to carry out logic operations. Each computer unit 5 is in the form of a programmable microprocessor, which in each case has a number of computer inputs 8 and a number of interfaces 9. The computer inputs 8 are configured to be unidirectional, for feeding in input signals. The interfaces 9 are configured to be bidirectional, for interchanging data with other system units.

Each circuit unit 7 in each case has unidirectional circuit inputs 10 via which input signals are likewise fed in. Some of the logic operations that can be carried out in the computer units 5 are simulated by electronic hardware components 12 in each circuit unit 7. In other words, when the input signals are the same, the circuit units 7 produces the same output signal as the computer unit 5, corresponding to the simulated logic operation. This results in a redundant, fail-safe architecture with regard to the simulated logic operation, which at the same time reliably avoids the occurrence of common-mode faults.

In the illustrated open-loop and closed-loop control unit 1, those logic operations which can be carried out in the computer unit 5 and are safety-critical with respect to the safety-relevant apparatus 3 are now simulated by hardware components in a circuit unit 7.

These are the evaluation operations that deduce the degree of door opening as a function of sensor signals. Triple-redundant proximity sensors 20, 21 and 22 as well as triple-redundant microswitches 24 are provided in order to detect the degree of door opening. Both sensor types, that is to say proximity switches and microswitches, detect the respective degree of door opening and the reaching of the necessary degree of door opening beyond which the emergency slide can be inflated. The monitoring of the door opening both by the proximity sensors 20, 21 and 22 and by microswitches 24 avoids the occurrence of common-mode faults at the sensor level. The measurement signals from the proximity sensors 20, 21 and 22 and from the triple-redundant microswitches 24 are in each case made available to the computer inputs 8 and circuit inputs 10 via signal lines 13, 14, 15 and 16. Mutually corresponding inputs in this case have the same input signals applied to them. Redundant systems, each containing the computer unit 5 and the circuit unit 7, are in this case connected in parallel with respect to the input signals. In each of these units, the circuit unit 7 and the computer unit 5 are in turn likewise connected in parallel with respect to the input signals. Each computer unit 5 also interchanges data via the interface 9 and a communication link 26 with other systems.

Initially, by comparison, each computer unit 5 chooses the at least double-corresponding signal for further processing, from the respectively triplicated signals from the proximity sensors 20, 21 and 22 and from the triple microswitches 24. In addition, the output signals from the microswitch 24 and from the proximity sensors 20, 21 and 22 are also compared with one another. If the output signals differ, the computer outputs 28 and the circuit outputs 29 remain inactive. This is referred to as a so-called "fail-safe" behavior.

In the same way, each circuit unit 7 makes a majority decision on the basis of the hardware circuit with respect to the incoming signals from the proximity sensors 20, 21 and 22 and from the triple microswitch 24.

Finally, each computer unit 5 uses the input signals from the proximity sensors 20, 21 and 22 and from the microswitch 24 to calculate an output signal that represents a value for the degree of door opening. Each circuit unit 7 also uses appropriate hardware components to determine a corresponding signal for the degree of door opening. The output signals determined in this way are in each case passed to a decision-making unit 30 via the computer output 28 and the circuit output 29 of each computer unit 5 and of each circuit unit 7. The decision-making unit 30 now determines the degree of correspondence between the output signals from the computer output 28 and the circuit output 29. If they correspond, that is to say the signal information is identical, then each decision-making unit 30 emits a corresponding output signal, which is passed to a logic unit 32. If there is no correspondence, then the corresponding decision-making unit 30 does not produce any output signal. The output signals from each decision-making unit 30 are passed via the connecting lines 33, 34 and 35 to the logic unit 32.

The logic unit 32 makes a majority decision in order to pass on a signal to the safety-relevant apparatus 3, and thus to release the emergency slide. The majority logic is in this case represented schematically by transistors 37, 38 and 39. If all three connecting lines 33, 34 and 35 produce an output signal, then the transistors 37, 38 and 39 are all switched on. All of the lines 40, 41 and 42 are drawn to earth potential, as the output signal. If an output signal is produced only on the connecting lines 33 and 34, then only the transistors 37 are switched on. In consequence, only the line 40 is drawn to earth potential. A corresponding situation applies to the lines 41 and 42 for corresponding output signals on the connecting lines 34 and 35, or 33 and 35, respectively.

If one of the lines 40, 41 and 42 has been drawn to earth potential, then the emergency slide is released on the basis of a majority decision in the apparatus 3. A light-emitting diode display 44 is provided in order to indicate whether at least two of the lines 40, 41 and 42 are at earth potential.

This application claims the priority, under 35 U.S.C. § 119, of German patent application No. 10 2004 033 263.0, filed Jul. 9, 2004; the entire disclosure of the prior application is herewith incorporated by reference.

I claim:

1. An open-loop and closed-loop control unit for a safety-relevant apparatus, comprising:
   a computer unit having a number of computer inputs and computer outputs;
   signal input lines;
   a decision making unit; and
   a circuit unit having a number of circuit inputs and circuit outputs, said circuit unit having hardware components for simulating some logic operations being carried out in said computer unit, said circuit inputs and said computer inputs corresponding to one another with respect to the logic operations being connected in parallel to a respective one of said signal input lines, said computer outputs and said circuit outputs corresponding to one another with respect to the logic operations are each connected to said decision-making unit;
   said decision-making unit outputting an output signal for open-loop control of the safety-relevant apparatus in dependence on a correspondence between signals from said computer outputs and from said circuit outputs.

2. The open-loop and closed-loop control unit according to claim 1, wherein a safety-critical portion of the logic operations carried out in said computer unit is simulated by said circuit unit by said hardware components.

3. The open-loop and closed-loop control unit according to claim 1,
   wherein said computer unit is one of at least two identical computer units;
   wherein said circuit unit is one of at least two identical circuit units, said computer units and said circuit units are connected in parallel with one another with respect to said signal input lines;
   wherein said decision making unit is one of at least two identical decision-making units having outputs outputting output signals;
   further comprising a logic unit, said outputs of said decision-making units are connected to said logic unit by which an open-loop control signal for the open-loop control of the safety-relevant apparatus can be emitted as a function of correspondence between the output signals of said decision making units.

4. The open-loop and closed-loop control unit according to claim 3, wherein there are an odd number of said computer units, said circuit units and said decision-making units, and said logic unit emits the open-loop control signal on a basis of a majority decision with respect to the output signals from said decision making units.

5. The open-loop and closed-loop control unit according to claim 1, wherein said computer unit checks signals from said circuit outputs and from said computer outputs.

6. The open-loop and closed-loop control unit according to claim 3, wherein said computer units check signals from said circuit outputs and from said computer outputs.

* * * * *